United States Patent
Murai et al.

(10) Patent No.: US 8,506,913 B2
(45) Date of Patent: Aug. 13, 2013

(54) ACIDIC GAS ABSORBENT, ACIDIC GAS REMOVAL DEVICE, AND ACIDIC GAS REMOVAL METHOD

(75) Inventors: Shinji Murai, Kanagawa (JP); Satoshi Saito, Kanagawa (JP); Yasuhiro Kato, Kanagawa (JP); Takehiko Muramatsu, Kanagawa (JP); Takashi Kuboki, Tokyo (JP); Hiroko Watando, Tokyo (JP); Asato Kondo, Kanagawa (JP); Yukishige Maezawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/519,274

(22) PCT Filed: Mar. 29, 2010

(86) PCT No.: PCT/JP2010/002268
§ 371 (c)(1), (2), (4) Date: Jun. 26, 2012

(87) PCT Pub. No.: WO2011/121633
PCT Pub. Date: Oct. 6, 2011

(65) Prior Publication Data
US 2012/0294785 A1    Nov. 22, 2012

(51) Int. Cl.
*B01D 53/62* (2006.01)
*C09K 3/00* (2006.01)

(52) U.S. Cl.
USPC ............................ 423/220; 252/184; 252/189

(58) Field of Classification Search
USPC .................. 423/228; 422/168; 252/184, 189
See application file for complete search history.

(56) References Cited

U.S. PATENT DOCUMENTS

| | | | |
|---|---|---|---|
| 3,167,561 A * | 1/1965 | Sarett et al. | 546/122 |
| 3,848,057 A | 11/1974 | Leder et al. | |
| 4,112,052 A | 9/1978 | Sartori et al. | |
| 4,217,237 A | 8/1980 | Sartori et al. | |
| 4,624,838 A * | 11/1986 | Pan et al. | 423/226 |
| 4,775,519 A * | 10/1988 | Yit Nieh | 423/226 |
| 4,894,179 A * | 1/1990 | Santori et al. | 252/189 |
| 4,959,086 A | 9/1990 | Van Baar et al. | |

(Continued)

FOREIGN PATENT DOCUMENTS

| | | |
|---|---|---|
| JP | 48 42987 | 6/1973 |
| JP | 61 71819 | 4/1986 |

(Continued)

OTHER PUBLICATIONS

International Search Report Issued Jun. 29, 2010 in PCT/JP10/02268 Filed Mar. 29, 2010.

(Continued)

*Primary Examiner* — Timothy Vanoy
(74) *Attorney, Agent, or Firm* — Oblon, Spivak, McClelland, Maier & Neustadt, L.L.P.

(57) ABSTRACT

An acidic gas absorbent having a high acidic gas absorption capacity, that is, a high acidic gas absorption amount and a high acidic gas absorption rate, an acidic gas absorption device, and a method for absorbing an acidic gas, are provided. An acidic gas absorbent containing an azabicyclo compound and a primary or secondary amine compound; an acidic gas absorbent containing a heteroaromatic ring compound and a primary or secondary amine compound; an acidic gas removal device using these acidic gas absorbents; and a method for removing an acidic gas are disclosed.

16 Claims, 1 Drawing Sheet

(56) References Cited

U.S. PATENT DOCUMENTS

2011/0214566 A1* 9/2011 Lee et al. .................. 95/173
2011/0223085 A1* 9/2011 Kelkar et al. ............. 423/228
2012/0248372 A1* 10/2012 Bara ......................... 252/184

FOREIGN PATENT DOCUMENTS

| JP | 61 181515 | 8/1986 |
|---|---|---|
| JP | 63 218231 | 9/1988 |
| JP | 2 172517 | 7/1990 |
| JP | 2871334 | 1/1999 |
| JP | 2008 307519 | 12/2008 |

OTHER PUBLICATIONS

U.S. Appl. No. 13/498,005, filed Mar. 23, 2012, Murai, et al.
Patent Examination Report issued Mar. 4, 2013 in Australian patent Application No. 2010349895.

* cited by examiner

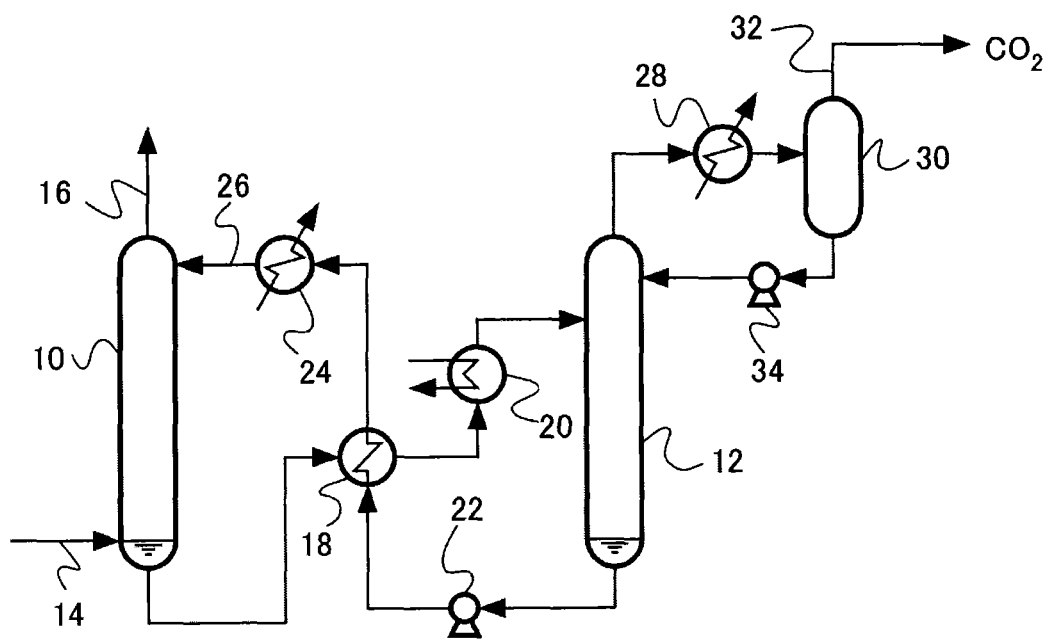

ACIDIC GAS ABSORBENT, ACIDIC GAS REMOVAL DEVICE, AND ACIDIC GAS REMOVAL METHOD

TECHNICAL FIELD

The present invention relates to an acidic gas absorbent, an acidic gas removal device using this absorbent, and a method for removing an acidic gas.

BACKGROUND ART

In recent years, the greenhouse effect caused by an increase in the $CO_2$ (carbon dioxide) concentration has been pointed out as a factor of the phenomenon of global warming, and there has been an urgent need for international countermeasures to protect the environment in a global scale. Major sources for $CO_2$ generation are places where industrial activities occur, and there is an increasing tendency to reduce the emission of $CO_2$. Therefore, with regard to the facilities such as thermal power generation plants which use fossil fuels, a method of bringing the exhaust gas generated when fossil fuels (coal, petroleum, natural gas, and the like) are combusted, into contact with an aqueous alkanolamine solution or the like, and thereby removing and recovering $CO_2$ in the combustion exhaust gas, and a method of storing the recovered $CO_2$ have been put into practice all over the world. Furthermore, it has been suggested to remove acidic gases such as $H_2S$ (hydrogen sulfide) in addition to $CO_2$, using an aqueous alkanolamine solution.

Examples of technologies for suppressing an increase in the concentration of acidic gases including $CO_2$, include the development of energy saving products, technologies for separating and recovering acidic gases that have been discharged, technologies for utilizing or separately storing acidic gases as resources, and the switchover to alternative energies such as natural energies and atomic energy, which do not emit any acidic gases. As the acidic gas separation technologies that have been hitherto studied, an absorption method, an adsorption method, a membrane separation method, a cryogenic method and the like are available. Among them, the absorption method is suitable for treating large amounts of gases, and thus, application thereof to manufacturing plants or power generation plants has been under examination.

In general, alkanolamines represented by monoethanolamine (MEA) have been developed since the 1930's, as substances to be used for the absorption method, and those substances are currently still in use (Patent Literature 1). This method is economically efficient, and an increase in size of the removal devices can be easily achieved.

Examples of existing alkanolamines that are widely used include monoethanolamine, 2-amino-2-methylpropanolamine, methylaminoethanol, ethylaminoethanol, propylaminoethanol, diethanolamine, bis(2-hydroxy-1-methylethyl) amine, methyldiethanolamine, dimethylethanolamine, diethylethanolamine, triethanolamine, and dimethylamino-1-methylethanol. Particularly, since methylethanolamine as a primary amine and diethylethanolamine as a secondary amine have fast reaction rates, these compounds have been widely used all over the world. However, there are problems with these compounds in terms of corrosiveness, requirement of high regeneration energy, degradation, and the like. Furthermore, methyldiethanolamine has low corrosiveness and requires low regeneration energy, but has a defect of a low absorption rate. Under such circumstances, there is a demand for the development of a new absorbent liquid.

In regard to the recent tendency of the development of absorbent liquids, among those amine-based absorbent liquids, research is being actively conducted on alkanolamines having structural steric hindrance in particular (Patent Literature 2). It is because alkanolamines having steric hindrance are advantageous in that the selectivity of acidic gases is very high, and less energy is required for regeneration. The reaction rates of sterically hindered amines are dependent on the degree of impediment of reaction determined by the steric structure of the compounds, and the reaction rates are lower than those of primary and secondary amines such as methylethanolamine and diethanolamine, but are higher than those of tertiary amines. For example, as alkanolamines used in absorbent liquids, 2-amino-2-methylpropanol, 2-piperidineethanol, and the like are known.

On the other hand, there are known methods of using cyclic amines that are different in structure from alkanolamines, as absorbents (Patent Literature 1 and Patent Literature 3).

CITATION LIST

Patent Literature

Patent Literature 1: Japanese Patent Application Laid-Open No. 2008-307519

Patent Literature 2: Japanese Patent No. 2871334

Patent Literature 3: U.S. Pat. No. 4,112,052

SUMMARY OF INVENTION

Technical Problem

First of all, it should be noted that the acidic gas absorption capacity, that is, the amount of acidic gas absorption and the rate of acidic gas absorption of the absorbent liquids that have been hitherto used are still insufficient from the viewpoint of economic efficiency.

The invention was made under such circumstances, and an object of the invention is to provide an acidic gas absorbent having a high acidic gas absorption capacity, an acidic gas removal device using this absorbent, and a method for removing an acidic gas.

Solution to Problem

The acidic gas absorbent according to an embodiment of the invention is characterized by containing an azabicyclo compound represented by the following general formula (1) and a primary or secondary amine compound:

[Chemical Formula 1]

General Formula (1)

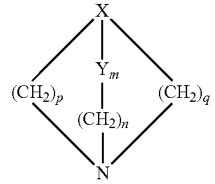

in the general formula (1), p and q each represent an integer of 1 or greater; m and n each represent an integer of 0 or greater; and the combination of X and Y represents any one of a combination of a nitrogen atom and a carbon atom, a combination of a carbon atom and a carbon atom, and a combination of a carbon atom and a nitrogen atom.

The acidic gas absorbent according to an embodiment of the invention is characterized by containing a heteroaromatic ring compound represented by any one of the following general formula (2) and general formula (3) and a primary or secondary amine compound:

[Chemical Formula 2]

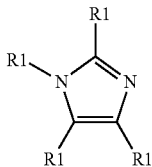

General Formula (2)

[Chemical Formula 3]

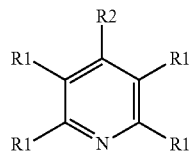

General Formula (3)

in the general formula (2) or general formula (3), R1s each represent any one selected from a hydrogen atom, an alkyl group, and an aromatic group; R1s may be identical with or different from each other; R2 represents an OR3 group or a NR4$_2$ group; R3 and R4 each represent any one selected from a hydrogen atom, an alkyl group, and an aromatic group; and R4s may be identical with or different from each other.

Advantageous Effect of Invention

According to the invention, an acidic gas absorbent having a high acidic gas absorption capacity, an acidic gas removal device using this absorbent, and a method for removing an acidic gas can be provided.

BRIEF DESCRIPTION OF DRAWINGS

FIG. 1 is a schematic diagram illustrating the acidic gas removal device of the fourth exemplary embodiment.

DESCRIPTION OF EMBODIMENTS

First Exemplary Embodiment

The acidic gas absorbent of the present exemplary embodiment is an acidic gas absorbent containing an azabicyclo compound represented by the following general formula (1) and a primary or secondary amine compound.

[Chemical Formula 4]

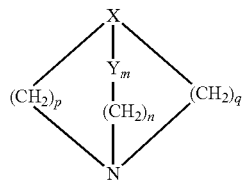

General Formula (1)

Here, in the general formula (1), p and q each represent an integer of 1 or greater; m and n each represent an integer of 0 or greater; and the combination of X and Y is any one of a combination of a nitrogen atom and a carbon atom, a combination of a carbon atom and a carbon atom, and a combination of a carbon atom and a nitrogen atom.

When the azabicyclo compound and the amine compound described above are dissolved in, for example, a solvent such as water, an acidic gas absorbent liquid having a high acidic gas absorption capacity can be obtained. Now, the case in which the acidic gas is carbon dioxide in particular will be illustrated as an example, but the same effects may also be obtained for other acidic gases such as hydrogen sulfide.

The azabicyclo compound represented by the general formula (1) has a structure in which a carbon atom that is bonded to a nitrogen atom is bound behind the nitrogen atom. For this reason, the steric hindrance around the unshared electron pair on the nitrogen atom is small, and nucleophilicity is markedly high. Accordingly, the absorption capacity of carbon dioxide is enhanced. In addition, the primary or secondary amine compound functions as a promoting agent that promotes the carbon dioxide absorption of such an azabicyclo compound, and thereby, the absorption capacity for carbon dioxide is further enhanced.

As the azabicyclo compound of the exemplary embodiment, use can be made of, for example, one compound or a mixture of two or more compounds selected from the group including 1-azabicyclo[1.1.0]butane, 1,3-diazabicyclo[1.1.0]butane, 1-azabicyclo[2.1.0]heptane, 1,3-diazabicyclo[2.1.0]heptane, 1,4-diazabicyclo[2.1.0]heptane, 1-azabicyclo[2.2.0]hexane, 1,3-diazabicyclo[2.2.0]hexane, 1-azabicyclo[2.1.1]hexane, 1,3-diazabicyclo[2.1.1]hexane, 1-azabicyclo[2.2.1]heptane, 1,3-diazabicyclo[2.2.1]heptane, 1,4-diazabicyclo[2.2.1]heptane, 1-azabicyclo[3.2.0]heptane, 1,3-diazabicyclo[3.2.0]heptane, 1,4-diazabicyclo[3.2.0]heptane, 1,6-diazabicyclo[3.2.0]heptane, 1-azabicyclo[2.2.2]octane, 1,3-diazabicyclo[2.2.2]octane, 1,4-diazabicyclo[2.2.2]octane, 1-azabicyclo[3.2.1]octane, 1,3-diazabicyclo[3.2.1]octane, 1,4-diazabicyclo[3.2.1]octane, 1,5-diazabicyclo[3.2.1]octane, 1,6-diazabicyclo[3.2.1]octane, 1-azabicyclo[4.1.1]octane, 1,3-diazabicyclo[4.1.1]octane, 1,4-diazabicyclo[4.1.1]octane, 1,5-diazabicyclo[4.1.1]octane, 1,6-diazabicyclo[4.1.1]octane, 1,7-diazabicyclo[4.1.1]octane, 1-azabicyclo[4.2.0]octane, 1,3-diazabicyclo[4.2.0]octane, 1,4-diazabicyclo[4.2.0]octane, 1,5-diazabicyclo[4.2.0]octane, 1,7-diazabicyclo[4.2.0]octane, 1-azabicyclo[3.3.1]nonane, 1,3-diazabicyclo[3.3.1]nonane, 1,4-diazabicyclo[3.3.1]nonane, 1,5-diazabicyclo[3.3.1]nonane, 1-azabicyclo[3.2.2]nonane, 1,3-diazabicyclo[3.2.2]nonane, 1,4-diazabicyclo[3.2.2]nonane, 1,5-diazabicyclo[3.2.2]nonane, 1,6-diazabicyclo[3.2.2]nonane, 1,8-diazabicyclo[3.2.2]nonane, 1-azabicyclo[4.3.0]nonane, 1,3-diazabicyclo[4.3.0]nonane, 1,4-diazabicyclo[4.3.0]nonane, 1,5-diazabicyclo[4.3.0]nonane, 1,6-diazabicyclo[4.3.0]nonane, 1,7-diazabicyclo[4.3.0]nonane, 1,8-diazabicyclo[4.3.0]nonane, 1-azabicyclo[4.2.1]nonane, 1,3-diazabicyclo[4.2.1]nonane, 1,4-diazabicyclo[4.2.1]nonane, 1,5-diazabicyclo[4.2.1]nonane, 1,6-diazabicyclo[4.2.1]nonane, 1,7-diazabicyclo[4.2.1]nonane, 1-azabicyclo[5.2.0]nonane, 1,3-diazabicyclo[5.2.0]nonane, 1,3-diazabicyclo[5.2.0]nonane, 1,4-diazabicyclo[5.2.0]nonane, 1,5-diazabicyclo[5.2.0]nonane, 1,6-diazabicyclo[5.2.0]nonane, 1,7-diazabicyclo[5.2.0]nonane, 1,8-diazabicyclo[5.2.0]nonane, 1-azabicyclo[5.1.1]nonane, 1,3-azabicyclo[5.1.1]nonane, 1,4-azabicyclo[5.1.1]nonane, 1,5-azabicyclo[5.1.1]nonane, 1,6-azabicyclo[5.1.1]nonane, 1,7-azabicyclo[5.1.1]nonane, 1-azabicyclo[6.1.0]nonane, 1,3-diazabicyclo[6.1.0]nonane, 1,4-diazabicyclo[6.1.0]nonane, 1,5-diazabicyclo[6.1.0]nonane, 1,6-diazabicyclo[6.1.0]nonane, 1,7-diazabicyclo[6.1.0]nonane, 1,8-diazabicyclo[6.1.0]nonane, 1-azabicyclo[7.1.0]decane, 1,9-diazabicyclo[7.1.0]decane, 1-azabicyclo[6.2.0]decane, 1,8-diazabicyclo[6.2.0]decane, 1-azabicyclo[6.1.1]decane, 1,8-diazabicyclo[6.1.1]decane, 1-azabicyclo[5.3.0]decane, 1,7-diazabicyclo[5.3.0]decane, 1-azabicyclo[5.2.1]decane, 1,7-diazabicyclo[5.2.1]decane, 1-azabicyclo[4.3.1]decane, 1,6-diazabicyclo[4.3.1]decane, 1-azabicyclo[4.2.2]decane, 1,6-diazabicyclo[4.2.2]decane, 1-azabicyclo[5.4.0]undecane, 1,7-diazabicyclo[5.4.0]undecane, 1-azabicyclo[5.3.1]undecane, 1,7-diazabicyclo[5.3.1]undecane, 1-azabicyclo[5.2.2]undecane, 1,7-diazabicyclo[5.2.2]undecane, 1-azabicyclo[4.4.1]undecane, 1,7-diazabicyclo[4.4.1]undecane, 1-azabicyclo[4.3.2]undecane, and 1,7-diazabicyclo[4.3.2]undecane.

In regard to the general formula (1) described above, it is preferable that p and q be each equal to or greater than 1 and equal to or less than 6. It is because if p and q are larger than 6, there is a risk that solubility in a solvent such as water may decrease, or the absorption capacity for acidic gases may deteriorate.

Furthermore, these azabicyclo compounds may also have a hydroxyl group, a primary, secondary, or tertiary amino group, a sulfonic acid group, a substituted or unsubstituted linear or branched alkyl group having 1 to 18 carbon atoms, a substituted or unsubstituted aromatic group, or the like bonded thereto.

The azabicyclo compounds are water-soluble, but it is effective to introduce a hydroxyl group, a carbonyl group, or an ester group so as to enhance water-solubility or to control sublimability. For example, a compound in which one or plural secondary carbon atoms in the bicyclo ring have been substituted by carbonyl groups, a compound in which one or plural secondary carbon atoms in the bicyclo ring have been esterified, a compound in which a hydroxyl group or an organic group having a hydroxyl group, such as a hydroxyl group, a hydroxymethyl group, or a hydroxyethyl group, is bonded to a secondary carbon atom or a tertiary carbon atom in the bicyclo ring, and the like are preferred.

The primary or secondary amine compound of the present exemplary embodiment functions as a promoting agent that promotes carbon dioxide absorption, as discussed above. Generally, the nitrogen atom of a primary amino group is bonded to carbon dioxide to form a carbamate ion, and thereby contributes to an enhancement of the initial absorption rate. Furthermore, the nitrogen atom of a secondary amino group takes the role of converting the bonded carbon dioxide to a bicarbonate ion ($HCO_3^-$), and contributes to an enhancement of the reaction rate in the latter half of the reaction.

The primary or secondary amine compound of the present exemplary embodiment is desirably an alkanolamine or a heterocyclic amine. When a solution, for example, an aqueous solution, of a composition combining an alkanolamine or a heterocyclic amine and an azabicyclo compound is used, the amount of carbon dioxide absorption per unit mole of the absorbent, the amount of carbon dioxide absorption per unit volume of the aqueous solution, and the absorption rate can be further enhanced. Furthermore, it is made possible to separate carbon dioxide after this absorption of carbon dioxide, and to decrease the energy required to regenerate the absorbent liquid.

Examples of the alkanolamine include monoethanolamine, 2-amino-2-methylpropanolamine, 2-amino-2-methyl-1,3-dipropanolamine, methylaminoethanol, ethylaminoethanol, propylaminoethanol, diethanolamine, bis(2-hydroxy-1-methylethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, diethanolamine, and 2-methyl-2-aminopropanol.

Furthermore, examples of the heterocyclic amine include piperazine, 2-methylpiperazine, hexamethylenetetramine, pyrrolidine, piperidine, azetidine, octahydroazocine, and hexahydro-1H-azepine. Particularly, it is desirable that the heterocyclic amine is a piperazine derivative, from the viewpoint of increasing the amount of carbon dioxide absorption and the absorption rate. Furthermore, it is more preferable that the piperazine derivative be at least one of piperazine, 2-methylpiperazine, and 2,5-dimethylpiperazine.

The process for absorption and separation of carbon dioxide is essentially composed of absorption of carbon dioxide at near room temperature, separation of the absorbed carbon dioxide from the absorbent liquid at a high temperature, and introducing the absorbent liquid again to the absorption process. Therefore, in the process for absorption and separation of carbon dioxide, a step in which a large amount of energy is consumed is the part of separating carbon dioxide from the absorbent liquid and thereby regenerating the absorbent liquid, and about 50% to 80% of energy used in the whole process is consumed in this process. That is, by reducing the energy consumed in the process for regeneration of the absorbent liquid, a process for absorption and separation of carbon dioxide, which is economically advantageous, is allowed.

According to the present exemplary embodiment, it is also possible to reduce the energy consumed in the regeneration process. Therefore, the process for absorption and separation of carbon dioxide that is more economically advantageous can be realized.

Second Exemplary Embodiment

The acidic gas absorbent of the present exemplary embodiment is an acidic gas absorbent containing a heteroaromatic ring compound represented by the following general formula (2) and a primary or secondary amine compound.

[Chemical Formula 5]

General Formula (2)

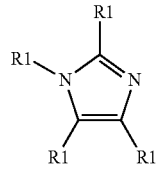

In the general formula (2), R1s each represent any one selected from a hydrogen atom, a substituted or unsubstituted alkyl group having 1 to 18 carbon atoms, and an aromatic group. The respective R1s may be identical substituents, or may be different substituents. Furthermore, R1s may form a ring together.

The heteroaromatic ring compound of the general formula (2) has a pKa of 6 or greater. First of all, since the heteroaromatic ring compound has lower basicity when compared with the aliphatic amine compound, the reaction heat upon the absorption of acidic gases such as carbon dioxide is reduced.

When the heteroaromatic ring compound and the amine compound are dissolved in, for example, a solvent such as water, an acidic gas absorbent liquid having a high acidic gas absorption capacity can be obtained as in the first exemplary embodiment. Now, the case in which the acidic gas is carbon dioxide in particular will be illustrated as an example, but the same effects may also be obtained for other acidic gases such as hydrogen sulfide.

In the heteroaromatic ring compound represented by the general formula (2), the unshared electron pair of the nitrogen atom occupying the sp2 hybrid orbital are not utilized in the formation of aromaticity. For this reason, this nitrogen atom has basicity. In addition, these heteroaromatic ring compounds form salt groups with acids, and therefore become water-soluble.

Similarly to the azabicyclo compound of the first exemplary embodiment, the heteroaromatic ring compound has a structure in which the carbon atom bonded to the nitrogen atom is bound beyond the nitrogen atom. For this reason, the steric hindrance around the unshared electron pair on the nitrogen atom is small, and nucleophilicity is markedly high. Therefore, the absorption capacity for carbon dioxide is increased. Furthermore, the primary or secondary amine compound functions as a promoting agent which promotes carbon dioxide absorption of such a heteroaromatic ring compound, and thereby, the absorption capacity for carbon dioxide is further enhanced.

As the heteroaromatic ring compound of the present exemplary embodiment, use can be made of, for example, one compound or a mixture of two or more compounds selected from the group including imidazole, 1-methylimidazole, 2-methylimidazole, 2-cyanoimidazole, 4-cyanoimidazole, benzimidazole, 1-methylbenzimidazole, and 2-methylbenzimidazole.

In the general formula (2) described above, when R1 is a substituted or unsubstituted alkyl group, the carbon number is preferably 1 or more to 6 or less. It is because if the carbon number is larger than 6, there is a risk that phase separation of the compound may occur.

Since the function of the primary or secondary amine compound of the present exemplary embodiment, or the composition and characteristics required in the present exemplary embodiment are the same as those of the first exemplary embodiment, further descriptions will not be repeated here.

Furthermore, according to the present exemplary embodiment, it is also possible to reduce the energy consumed in the regeneration process, as in the first exemplary embodiment. Therefore, a process for absorption and separation of carbon dioxide, which is more economically advantageous, is allowed.

Third Exemplary Embodiment

The acidic gas absorbent of the present exemplary embodiment is an acidic gas absorbent containing a heteroaromatic ring compound represented by the following general formula (3) and a primary or secondary amine compound.

[Chemical Formula 6]

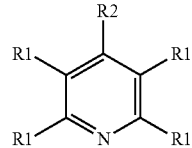

General Formula (3)

In the general formula (3), R1s each represent any one selected from a hydrogen atom, a substituted or unsubstituted alkyl group having 1 to 18 carbon atoms, and an aromatic group. The respective R1s may be identical substituents, or may be different substituents. Furthermore, R1s may form a ring together. R2 represents an OR3 group or a NR4$_2$ group. R3 and R4 each represent anyone selected from a hydrogen atom, an alkyl group, and an aromatic group, and R4s may be identical with or different from each other.

The acidic gas absorbent of the present exemplary embodiment is the same as that of the second exemplary embodiment, except that the heteroaromatic ring compound is represented not by the general formula (2), but by the general formula (3). Therefore, in connection with the matters overlapping with the second exemplary embodiment, descriptions will not be repeated.

The heteroaromatic ring compound of the general formula (3) has a pKa of 6 or greater. First of all, since the heteroaromatic ring compound has lower basicity when compared with the aliphatic amine compound, the reaction heat upon the absorption of acidic gases such as carbon dioxide is reduced.

By introducing an appropriate substituent to R2, the nucleophilicity or basicity of the heteroaromatic ring compound of the present exemplary embodiment can be adjusted to desired characteristics. When an OR3 group or a NR4$_2$ group is introduced to R2, nucleophilicity or basicity is enhanced. The OR3 group is, for example, (OCH$_3$, OC$_2$H$_5$, OC$_3$H$_7$, OC(CH$_3$)$_3$, or OC$_6$H$_5$).

When the heteroaromatic ring compound and the amine compound are dissolved in, for example, a solvent such as water, an acidic gas absorbent liquid having a high acidic gas absorption capacity can be obtained as in the first and second exemplary embodiments. Now, the case in which the acidic gas is carbon dioxide in particular will be illustrated as an example, but it is expected to obtain the same effects for other acidic gases such as hydrogen sulfide.

As the heteroaromatic ring compound of the present exemplary embodiment, use can be made of, for example, one compound or a mixture of two or more compounds selected from the group including pyridine, 4-aminopyridine, 4-methylpyridine, 4-methoxypyridine, 4-methylaminopyridine, 4-dimethylaminopyridine, 4-diaminomethylpyridine, 2-aminopyridine, quinoline, 4-methylquinoline 4-methoxyquinoline, 4-methylaminoquinoline, 4-dimethylaminoquinoline, isoquinoline, 6-methylaminoisoquinoline, 6-dimethylaminoisoquinoline, phenanthridine, 1-aminophenthridine, 1-methylaminophenanthridine, 1-dimethylaminophenanthridine, 4-methoxypyridine, 4-ethoxypyridine, 4-propoxypyrdine, 4-t-butoxypyridine, and 4-phenoxypyridine.

It is preferable that the NR4$_2$ group, which is a substituent of the general formula (3), be any of an amino group, a methylamino group, and a dimethylamino group. It is because nucleophilicity or basicity is enhanced, and the amount of carbon dioxide absorption and the absorption rate are increased.

Since the function of the primary or secondary amine compound of the present exemplary embodiment, or the composition and characteristics required in the present exemplary embodiment are the same as those of the first exemplary embodiment, further descriptions will not be repeated here.

Furthermore, according to the present exemplary embodiment, it is also possible to reduce the energy consumed in the regeneration process, as in the first and second exemplary embodiments. Therefore, a process for absorption and separation of carbon dioxide, which is more economically advantageous, is allowed.

Fourth Exemplary Embodiment

The acidic gas removal device of the present exemplary embodiment is an acidic gas removal device including an absorption column that brings a gas containing an acidic gas into contact with an acidic gas absorbent liquid and thereby causes the acidic gas absorbent liquid to absorb the acidic gas; and a regeneration column that regenerates the acidic gas absorbent liquid that has absorbed the acidic gas, in which the acidic gas absorbent liquid regenerated in the regeneration column is reused in the absorption column, and the absorbent liquid contains any one of the acidic gas absorbents described in the first to third exemplary embodiments.

FIG. 1 is a schematic diagram of the acidic gas removal device of the present exemplary embodiment. This acidic gas removal device includes an absorption column 10 that brings a gas containing an acidic gas into contact with an acidic gas absorbent liquid to absorb and remove the acidic gas; and a regeneration column 12 that separates the acidic gas from the acidic gas absorbent liquid that has absorbed the acidic gas, and regenerates the acidic gas absorbent liquid. In the following, an example of treating carbon dioxide as the acidic gas will be described.

For example, as in the case of the combustion exhaust gas of a thermal power generation plant, a gas containing carbon dioxide is led to the lower part of the absorption column 10 through a gas supply port 14. The gas introduced into the absorption column 10 is brought into contact with an absorbent liquid for carbon dioxide that is supplied from the upper part of the absorption column 10. This absorbent liquid for carbon dioxide is a solution, for example, an aqueous solution, containing the acidic gas absorbent described in the first to third exemplary embodiments.

The acidic gas absorbent liquid may have the pH adjusted to at least 9 or higher, but appropriate optimal conditions may be selected depending on the type, concentration, flow rate, and the like of a harmful gas in the exhaust gas. Furthermore, this acidic gas absorbent liquid may contain, in addition to the acidic gas absorbent and the solvent such as water, other compounds such as a nitrogen-containing compound for enhancing the absorption capacity, an oxidation inhibitor, and a pH adjusting agent, at any arbitrary proportions.

When the gas is brought into contact with the absorbent liquid for carbon dioxide, carbon dioxide in the gas is absorbed and removed. Then, the gas is discharged out of the absorption column 10 through a gas discharge port 16.

The absorbent liquid that has absorbed carbon dioxide is sent to a heat exchanger 18 and a heater 20 to be heated, and is sent to the regeneration column 12. Inside the regeneration column 12, the absorbent liquid flows to the lower part of the regeneration column 12. In the meantime, carbon dioxide in the gas is desorbed and regenerated.

The regenerated absorbent liquid is passed through the heat exchanger 18 and an absorbent liquid cooler 24 by a pump 22, and is returned to the absorption column 10 through an absorbent liquid supply port 26.

Meanwhile, at the upper part of the regeneration column 12, the carbon dioxide that has been separated from the absorbent liquid is brought into contact with reflux water that is supplied thereto, and then is discharged out of the regeneration column 12. Carbon dioxide is then cooled by a reflux cooler 28. Furthermore, carbon dioxide is separated in a reflux drum 30 from the reflux water produced as the water vapor associated with carbon dioxide has condensed, and then is led by a recovered carbon dioxide line 32 to a carbon dioxide recovery process. The reflux water thus separated is sent to the regeneration column 12 by a reflux water pump 34.

When the acidic gas removal device of the present exemplary embodiment is used, highly efficient absorption and removal of carbon dioxide can be carried out by using an absorbent liquid having excellent carbon dioxide absorption and desorption characteristics.

Fifth Exemplary Embodiment

The method for removing an acidic gas of the present exemplary embodiment involves bringing a gas containing an acidic gas into contact with an acidic gas absorbent liquid prepared by dissolving the acidic gas absorbent described in the first to third exemplary embodiments in a solvent, and removing the acidic gas from the gas containing the acidic gas.

The acidic gas absorbent liquid may have the pH adjusted to at least 9 or higher, but appropriate optimal conditions may be selected depending on the type, concentration, flow rate, and the like of a harmful gas in the exhaust gas. Furthermore, this acidic gas absorbent liquid may contain, in addition to the acidic gas absorbent and the solvent such as water, other compounds such as a nitrogen-containing compound for enhancing the absorption capacity, an oxidation inhibitor, and a pH adjusting agent, at any arbitrary proportions.

When the method for removing an acidic gas of the present exemplary embodiment is used, highly efficient absorption and removal of carbon dioxide can be carried out by using an absorbent liquid having excellent carbon dioxide absorption and desorption characteristics.

As discussed above, the exemplary embodiments of the invention have been described with reference to specific examples. The exemplary embodiments are only for illustrative purposes, and are not intended to limit the invention. Furthermore, in the descriptions of the exemplary embodiments, descriptions on parts that are not directly needed in the explanation of the invention have not been repeated with regard to the acidic gas absorbent, the acidic gas removal device, the method for removing an acidic gas, and the like. However, necessary elements related to the acidic gas absorbent, acidic gas removal device, method for removing an acidic gas, and the like can be appropriately selected and used.

In addition, it is intended that all the acidic gas absorbents, acidic gas removal devices, and methods for removing an acidic gas that include the elements of the invention and can be appropriately modified in design by those having ordinary skill in the art, are included in the scope of the invention. The scope of the invention is intended to be defined by the scope of the claims and the scope of equivalents thereof.

EXAMPLES

Next, the invention will be described in detail by way of Examples and Comparative Example, but the invention is not intended to be limited to these Examples.

The compositions of the respective aqueous solutions of Examples and Comparative Example are presented in Table 1, and the measurement results are presented in Table 2.

Example 1

An aqueous solution was prepared to contain diazabicyclooctane (DABCO) at 3.0 mol/L, and piperazine (PZ) at 0.6 mol/L. The aqueous solution was transferred to a glass container, and the glass container was installed in a water bath that has been adjusted to 40° C. A gas mixture of 10%/90%=$CO_2$/$N_2$ was introduced into this aqueous solution, $CO_2$ was absorbed, and the $CO_2$ concentration at the outlet was measured using a $CO_2$ concentration meter (CGT-7000, manufactured by Shimadzu Corp.). Thus, the absorption rate of $CO_2$ absorbed into the aqueous solution and the $CO_2$ concentration in the aqueous solution were measured. The absorption rate was 0.4 mol-$CO_2$/mol-amine per hour, and the amount of absorption was 0.5 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.10 mol-$CO_2$/mol-amine. It was found that in the course of absorbing $CO_2$ at 40° C. and desorbing $CO_2$ at 120° C., $CO_2$ can be recovered at a rate of 0.4 mol-$CO_2$/mol-amine, which is different by 0.1 mol from 0.5 mol.

Example 1'

$CO_2$ was absorbed in a water bath adjusted to 30° C. in the same manner as in Example 1. In this case, the absorption rate was 0.4 mol-$CO_2$/mol-amine per hour, and the amount of absorption was 0.621 mol-$CO_2$/mol-amine.

Example 2

An aqueous solution was prepared to contain diazabicyclooctane (DABCO) at 2.5 mol/L, piperazine at 0.6 mol/L, and 2-methyl-2-aminopropanol at 1.0 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.4 mol-$CO_2$/mol-amine per hour, and the amount of absorption was 0.47 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.10 mol-$CO_2$/mol-amine. It was found that in the course of absorbing $CO_2$ at 40° C. and desorbing $CO_2$ at 120° C., $CO_2$ can be recovered at a rate of 0.37 mol-$CO_2$/mol-amine, which is different by 0.1 mol from 0.47 mol.

Example 3

An aqueous solution was prepared to contain 1-methylimidazole at 0.6 mol/L and piperazine at 3.0 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.34 mol-$CO_2$/mol-amine per hour, and the amount of absorption was 0.34 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.04 mol-$CO_2$/mol-amine. It was found that in the course of absorbing $CO_2$ at 40° C. and desorbing $CO_2$ at 120° C., $CO_2$ can be recovered at a rate of 0.30 mol-$CO_2$/mol-amine.

Example 4

An aqueous solution was prepared to contain 1-methylimidazole at 0.6 mol/L, piperazine at 2.8 mol/L, and methylaminoethanol at 0.2 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.35 mol-$CO_2$/mol-amine per hour, and the amount of absorption was 0.36 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.05 mol-$CO_2$/mol-amine. It was found that in the course of absorbing $CO_2$ at 40° C. and desorbing $CO_2$ at 120° C., $CO_2$ can be recovered at a rate of 0.31 mol-$CO_2$/mol-amine.

Example 5

An aqueous solution was prepared to contain 4-dimethylaminopyridine at 3.0 mol/L and piperazine at 0.6 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.41 mol-$CO_2$/mol-amine per hour, and the amount of absorption was 0.48 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.06 mol-$CO_2$/mol-amine. It was found that in the course of absorbing $CO_2$ at 40° C. and desorbing $CO_2$ at 120° C., $CO_2$ can be recovered at a rate of 0.42 mol-$CO_2$/mol-amine.

Example 6

An aqueous solution was prepared to contain 4-aminopyridine at 3.0 mol/L and piperazine at 0.6 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.39 mol-$CO_2$/mol-amine per hour, and the amount of absorption was 0.46 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.05 mol-$CO_2$/mol-amine. It was found that in the course of absorbing $CO_2$ at 40° C. and desorbing $CO_2$ at 120° C., $CO_2$ can be recovered at a rate of 0.41 mol-$CO_2$/mol-amine.

Example 7

An aqueous solution was prepared to contain 4-methylaminopyridine at 3.0 mol/L and piperazine at 0.6 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.38 mol-$CO_2$/mol-amine per hour, and the amount of absorption was 0.44 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.04 mol-$CO_2$/mol-amine. It was found that in the course of absorbing $CO_2$ at 40° C. and desorbing $CO_2$ at 120° C., $CO_2$ can be recovered at a rate of 0.40 mol-$CO_2$/mol-amine.

Example 8

An aqueous solution was prepared to contain 4-dimethylaminopyridine at 2.8 mol/L, piperazine at 0.6 mol/L, and monoethanolamine at 0.2 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.36 mol-$CO_2$/mol-amine per hour, and the amount of absorption was 0.42 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.06 mol-$CO_2$/mol-amine. It was found that in the course of absorbing $CO_2$ at 40° C. and desorbing $CO_2$ at 120° C., $CO_2$ can be recovered at a rate of 0.34 mol-$CO_2$/mol-amine.

Example 9

An aqueous solution was prepared to contain 4-dimethylaminopyridine at 2.8 mol/L, piperazine at 0.6 mol/L, and methylaminoethanol at 0.2 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.36 mol-$CO_2$/mol-amine per hour, and the amount of absorption was 0.41 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.05 mol-$CO_2$/mol-amine. It was found that in the course of absorbing $CO_2$ at 40° C. and desorbing $CO_2$ at 120° C., $CO_2$ can be recovered at a rate of 0.36 mol-$CO_2$/mol-amine.

Example 10

An aqueous solution was prepared to contain 4-dimethylaminopyridine at 3.0 mol/L and 2-methylpiperazine at 0.6 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.40 mol-$CO_2$/mol-amine per hour, and the amount of absorption was 0.48 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.06 mol-$CO_2$/mol-amine. It was found that in the course of absorbing $CO_2$ at 40° C. and desorbing $CO_2$ at 120° C., $CO_2$ can be recovered at a rate of 0.42 mol-$CO_2$/mol-amine.

Comparative Example 1

A comparative example was carried out by using methyldiethanolamine (MDEA) as a representative example of a tertiary amine. An aqueous solution was prepared to contain MDEA at 3.0 mol/L and piperazine at 0.6 mol/L. In the same manner as in Example 1, a gas mixture of 10%/90%=$CO_2$/$N_2$ was introduced into the aqueous solution at 40° C., $CO_2$ was absorbed, and the $CO_2$ concentration at the outlet was measured. Thus, the absorption rate of $CO_2$ absorbed into the aqueous solution and the $CO_2$ concentration in the aqueous solution were measured. The absorption rate was 0.33 mol-$CO_2$/mol-amine per hour, and the amount of absorption was 0.32 mol-$CO_2$/mol-amine. Next, the temperature of the absorbent liquid was set to 120° C., a gas at a $CO_2$ concentration of 100% was introduced, and the amount of absorption in the case of a 100% concentration of $CO_2$ was measured. The amount of absorption was 0.06 mol-$CO_2$/mol-amine. It was found that in the course of absorbing $CO_2$ at 40° C. and desorbing $CO_2$ at 120° C., $CO_2$ can be recovered at a rate of 0.26 mol-$CO_2$/mol-amine, which is different by 0.06 mol from 0.32 mol.

TABLE 1

| | amine | mol/l | amine | mol/l | amine | mol/l |
|---|---|---|---|---|---|---|
| Exampl 1 | DABCO | 3.0 | PZ | 0.6 | — | — |
| Exampl 2 | DABCO | 2.5 | PZ | 0.6 | 2-Methyl-2-amino-propanol | 1.0 |
| Exampl 3 | 1-Methyl imidazole | 0.6 | PZ | 3.0 | — | — |
| Exampl 4 | 1-Methyl imidazole | 0.6 | PZ | 2.8 | Methylaminoethanol | 0.2 |
| Exampl 5 | 4-Dimethylaminopyridine | 3.0 | PZ | 0.6 | — | — |
| Exampl 6 | 4-Aminopyridine | 3.0 | PZ | 0.6 | — | — |
| Exampl 7 | 4-Methylaminopyridine | 3.0 | PZ | 0.6 | — | — |

TABLE 1-continued

| | amine | mol/l | amine | mol/l | amine | mol/l |
|---|---|---|---|---|---|---|
| Exampl 8 | 4-Dimethylaminopyridine | 2.8 | PZ | 0.6 | Monoethanolamine | 0.2 |
| Exampl 9 | 4-Dimethylaminopyridine | 2.8 | PZ | 0.6 | Methylaminoethanol | 0.2 |
| Exampl 10 | 4-Dimethylaminopyridine | 3.0 | 2-Methylpiperazine | 0.6 | — | — |
| Comparative Example 1 | MDEA | 3.0 | PZ | 0.6 | — | — |

TABLE 2

| | Absorption rate/h mol-CO2/mol-amine | Amount of absorption at 40° C. mol-CO2/mol-amine | Amount of absorption at 120° C. mol-CO2/mol-amine | Recovery amount mol-CO2/mol-amine |
|---|---|---|---|---|
| Exampl 1 | 0.40 | 0.50 | 0.10 | 0.40 |
| Exampl 2 | 0.40 | 0.47 | 0.10 | 0.37 |
| Exampl 3 | 0.34 | 0.34 | 0.04 | 0.30 |
| Exampl 4 | 0.35 | 0.36 | 0.05 | 0.31 |
| Exampl 5 | 0.41 | 0.48 | 0.06 | 0.42 |
| Exampl 6 | 0.39 | 0.46 | 0.05 | 0.41 |
| Exampl 7 | 0.38 | 0.44 | 0.04 | 0.40 |
| Exampl 8 | 0.36 | 0.42 | 0.06 | 0.34 |
| Exampl 9 | 0.36 | 0.41 | 0.05 | 0.36 |
| Exampl 10 | 0.40 | 0.48 | 0.06 | 0.42 |
| Comparative Example 1 | 0.33 | 0.32 | 0.06 | 0.26 |

As discussed above, it was found that the absorbent liquids containing diazabicyclooctane (DABCO) as disclosed in the Examples have absorption rates and amounts of absorption that are higher by 20% as compared with the conventional absorbent liquid containing a representative tertiary amine, and also have satisfactory recovery amounts.

It was found that the absorbent liquids containing 1-methylimidazole as disclosed in the Examples have satisfactory recovery amounts as compared with the conventional absorbent liquid containing a representative tertiary amine. It was found that the absorbent liquids containing any of dimethylaminopyridine, 4-aminopyridine, and 4-methylaminopyridine as disclosed in the Examples are satisfactory in terms of the absorption rate, the amount of absorption, and the recovery amount, as compare with the conventional absorbent liquid containing a representative tertiary amine.

REFERENCE SIGNS LIST

10 Absorption column
12 Regeneration column

The invention claimed is:

1. An acidic gas absorbent comprising an azabicyclo compound represented by the following general formula (1) and a primary or secondary amine compound:

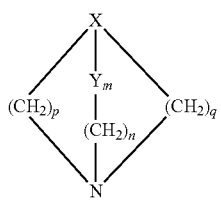

Formula (1)

wherein in the general formula (1), p and q each represent an integer of 1 or greater; m and n each represent an integer of 0 or greater; and the combination of X and Y represents any one of a combination of a nitrogen atom and a carbon atom, a combination of a carbon atom and a carbon atom, and a combination of a carbon atom and a nitrogen atom.

2. The acidic gas absorbent according to claim 1, wherein p and q each represent an integer of 6 or less.

3. The acidic gas absorbent according to claim 2, wherein the amine compound is an alkanolamine or a heterocyclic amine.

4. The acidic gas absorbent according to claim 3, wherein the acidic gas adsorbent comprises a piperazine derivative.

5. The acidic gas absorbent according to claim 1, wherein the combination of X and Y represents a combination of a nitrogen atom and a carbon atom.

6. The acidic gas absorbent according to claim 1, wherein the combination of X and Y represents a combination of a carbon atom and a carbon atom.

7. The acidic gas absorbent according to claim 1, wherein the combination of X and Y represents a combination of a carbon atom and a nitrogen atom.

8. The acidic gas absorbent according to claim 1, wherein the amine compound is an alkanolamine.

9. An acidic gas absorbent comprising a heteroaromatic ring compound represented by any one of the following general formula (2) and general formula (3), and a primary or secondary amine compound:

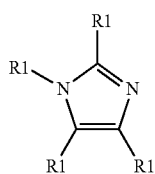

Formula (2)

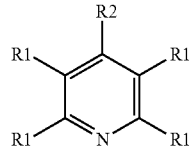

Formula (3)

wherein in the general formula (2) and general formula (3), R1s each represent any one selected from a hydrogen atom, an alkyl group, and an aromatic group; R1s may be identical with or different from each other; R2 represents an OR3 group or a NR4$_2$ group; R3 and R4 each represent any one selected from a hydrogen atom, an alkyl group, and an aromatic group; and R4s may be identical with or different from each other.

10. The acidic gas absorbent according to claim 9, wherein the amine compound is a heterocyclic amine.

11. The acidic gas absorbent according to claim 10, wherein the heterocyclic amine is a piperazine derivative.

12. The acidic gas absorbent according to claim 11, wherein the NR4$_2$ group of the general formula (3) is any of an amino group, a methylamino group, and a dimethylamino group.

13. The acidic gas absorbent according to claim 9, wherein the heteroaromatic ring compound is represented by Formula (2).

14. The acidic gas absorbent according to claim 9, wherein the heteroaromatic ring compound is represented by Formula (3).

15. A method for removing an acidic gas, the method comprising bringing a gas containing an acidic gas into contact with an acidic gas absorbent liquid which is prepared by dissolving an acidic gas absorbent containing an azabicyclo compound represented by the following general formula (1) and a primary or secondary amine compound in a solvent; and removing the acidic gas from the gas containing the acidic gas:

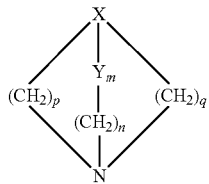

Formula (1)

wherein in the general formula (1), p and q each represent an integer of 1 or greater; m and n each represent an integer of 0 or greater; and the combination of X and Y represents any one of a combination of a nitrogen atom and a carbon atom, a combination of a carbon atom and a carbon atom, and a combination of a carbon atom and a nitrogen atom.

16. A method for removing an acidic gas, the method comprising bringing a gas containing an acidic gas into contact with an acidic gas absorbent liquid which is prepared by dissolving an acidic gas absorbent containing a heteroaromatic ring compound represented by any one of the following general formula (2) and general formula (3) and a primary or secondary amine compound in a solvent; and removing the acidic gas from the gas containing the acidic gas:

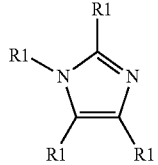

Formula (2)

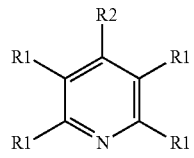

Formula (3)

wherein in the general formula (2) and general formula (3), R1s each represent any one selected from a hydrogen atom, an alkyl group, and an aromatic group; R1s may be identical with or different from each other; R2 represents an OR3 group or a NR4$_2$ group; R3 and R4 each represent any one selected from a hydrogen atom, an alkyl group, and an aromatic group; and R4s may be identical with or different from each other.

* * * * *